(12) United States Patent
Fouda et al.

(10) Patent No.: US 11,873,711 B2
(45) Date of Patent: Jan. 16, 2024

(54) REMOTE FIELD EDDY CURRENT TOOLS

(71) Applicant: Halliburton Energy Services, Inc., Houston, TX (US)

(72) Inventors: Ahmed Elsayed Fouda, Spring, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 733 days.

(21) Appl. No.: 16/334,217

(22) PCT Filed: Oct. 24, 2016

(86) PCT No.: PCT/US2016/058500
§ 371 (c)(1),
(2) Date: Mar. 18, 2019

(87) PCT Pub. No.: WO2018/080429
PCT Pub. Date: May 3, 2018

(65) Prior Publication Data
US 2019/0218904 A1    Jul. 18, 2019

(51) Int. Cl.
*E21B 47/085* (2012.01)
*G01B 7/06* (2006.01)
*G01N 27/90* (2021.01)

(52) U.S. Cl.
CPC ............. *E21B 47/085* (2020.05); *G01B 7/10* (2013.01); *G01N 27/90* (2013.01); *G01N 27/908* (2013.01)

(58) Field of Classification Search
CPC ........ E21B 47/085; G01B 7/10; G01N 27/908
See application file for complete search history.

(56) References Cited

U.S. PATENT DOCUMENTS

| 4,292,589 A | 9/1981 | Bonner |
| 6,037,768 A * | 3/2000 | Moulder ............ G01N 27/9046 324/202 |

(Continued)

FOREIGN PATENT DOCUMENTS

| WO | 2017196371 A1 | 11/2017 |
| WO | 2018031044 A1 | 2/2018 |

OTHER PUBLICATIONS

Yang et al., "Pulsed remote field technique used for nondestructive inspection of ferromagnetic tube", NDT&E International 53 (2013) 47-52 (Year: 2013).*

(Continued)

*Primary Examiner* — Regis J Betsch
(74) *Attorney, Agent, or Firm* — DeLizio, Peacock, Lewin & Guerra, LLP

(57) ABSTRACT

Apparatus and methods to investigate a multiple nested conductive pipe structure can be implemented in a variety of applications. An electromagnetic pulsed tool disposed in the multiple nested conductive pipe structure in a wellbore can make a set of log measurements and provide a measured log at different depths in the multiple nested conductive pipe structure. The total thickness of the multiple nested conductive pipes can be determined at each depth in the measured log using a remote field eddy current look-up curve. The remote field eddy current look-up curve can be correlated to a remote field eddy current regime in time-domain associated with time decay response. Additional apparatus, systems, and methods are disclosed.

20 Claims, 10 Drawing Sheets

(56) References Cited

U.S. PATENT DOCUMENTS

| | | | |
|---|---|---|---|
| 6,344,741 B1 | 2/2002 | Giguere et al. | |
| 8,958,989 B2 | 2/2015 | Legendre et al. | |
| 2013/0193953 A1 | 8/2013 | Yarbro et al. | |
| 2014/0114892 A1* | 4/2014 | Quirein | E21B 47/005 706/20 |
| 2015/0204648 A1 | 7/2015 | Nichols | |
| 2015/0219601 A1 | 8/2015 | Davydov et al. | |
| 2015/0268030 A1* | 9/2015 | White | G01B 11/06 250/353 |
| 2015/0338541 A1* | 11/2015 | Nichols | G01V 3/26 324/338 |
| 2016/0070018 A1* | 3/2016 | Nichols | G01V 3/28 324/339 |
| 2016/0109610 A1* | 4/2016 | Donderici | G01V 1/40 324/333 |
| 2016/0168975 A1 | 6/2016 | Donderici et al. | |
| 2018/0180759 A1* | 6/2018 | Smiarowski | G01V 3/17 |

OTHER PUBLICATIONS

Chen et al., "Electrical conductivity measurement of ferromagnetic metallic materials using pulsed eddy current method" NDT&E International 75 (2015) 33-38 (Year: 2015).*

Acuna, et al., "Scanning for Downhole Corrosion", Oilfield Review Spring 2010: 22, No. 1, p. 42-50.

Haugland, "Fundamental analysis of the remote-field eddy-current effect", IEEE Transactions on Magnetics, vol. 32, No. 4, pp. 3195-3211, Jul. 1996.

Li, et al., "Efficient analytical modelling for Pulsed Remote Field Eddy Current evaluation of stratified tubular structures", 2013 Far East Forum on Nondestructive Evaluation/Testing: New Technology and Application, Jinan, 2013, pp. 18-22.

PCT Application Serial No. PCT/US16/58500, International Search Report, dated Jul. 10, 2017 mailed, 3 pages.

PCT Application Serial No. PCT/US16/58500, International Written Opinion, dated Jul. 10, 2017 mailed, 7 pages.

* cited by examiner

REMOTE FIELD EDDY CURRENT TOOLS

TECHNICAL FIELD

The present invention relates generally to apparatus and methods with respect to measurements related to oil and gas exploration.

BACKGROUND

Early detection of corrosion in well casings is crucial to ensure the integrity and the safety of the well. State-of-the-art methods for downhole corrosion detection involve running corrosion detection tools in the production tubing. Different types of corrosion detection tools include mechanical calipers, ultrasonic acoustic tools, cameras, electromagnetic flux leakage, and electromagnetic induction tools. Among all these tools, only electromagnetic (EM) induction tools can be used to detect corrosion in outer casings beyond that in which the tool is run. Existing EM induction corrosion detection tools comprise at least one transmitting coil and at least one receiving coil. The transmitter generates a primary field that induces eddy currents inside the metallic pipes, and the receiver records secondary fields generated from the pipes. Those secondary fields bear information about the electrical properties and metal content of the pipes and can be inverted for any corrosion or loss in metal content of the pipes. EM sensing may provide continuous, in situ measurements of the integrity of tubing/casing. EM technologies developed for such monitoring applications can be categorized into two groups: frequency-domain techniques and time-domain techniques. The usefulness of such measurements may be related to the precision or quality of the information and the presentation of the data derived from such measurements.

DETAILED DESCRIPTION

Figure 1A:
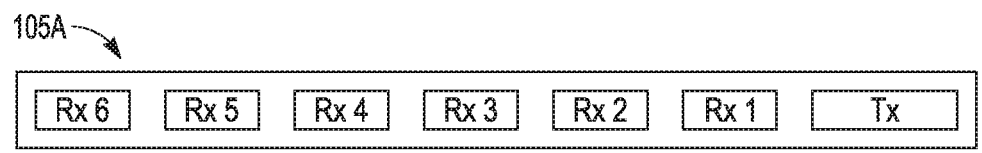
FIG. 1A is a schematic of a tool with one transmitter and multiple receivers spaced from the transmitter, which configuration can be used in time-domain and frequency-domain tools, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, mechanical, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, remote field eddy current tools can include techniques to conduct remote field eddy current (RFEC) processing. Such tools can include pulsed eddy current electromagnetic tools. Such tools can also be realized as corrosion pulsed eddy current electromagnetic corrosion detection tools (EMCDTs). RFEC tools can comprise collocated transmitters and receivers. RFEC processing can provide total thickness of pipe strings under investigation in real-time. Thickness of individual pipes in a nested arrangement can be determined using RFEC processing. Such thickness analysis can be used to inspect the pipes to determining the location and size of defects in the pipes.

Herein, multiple nested conductive pipes are a structure having a set of two or more conductive pipes nested within each other, the set having an innermost pipe and an outermost pipe, where the innermost pipe has the smallest outer diameter of the pipes of the set, the outermost pipe has the largest outer diameter of the pipes of the set, and the remaining pipes of the set have outer diameters of value greater than the value of the outer diameter of the innermost pipe and less the than the value of the outer diameter of the outermost pipe with each pipe of the set having a different outer diameter with respect to the other pipes of the set.

At a point on a reference axis within the innermost pipe of the set in the longitudinal direction of the innermost pipe, a plane perpendicular to the reference axis intersects the pipes of the multiple nested conductive pipes. The multiple nested conductive pipes may be referred to as a conductive multi-pipe structure. In various embodiments, multiple nested conductive pipes can be realized by a set of concentric pipes. However, a multiple nested conductive pipe structure is not limited to a set of concentric pipes. The pipes that comprise the multiple nested conductive pipes may be realized in a number of formats such as, but not limited to, casings and tubings.

Electromagnetic induction tools can be frequency-domain (FD) tools that operate at discrete set of frequencies. Higher frequencies can be used to inspect inner pipes of multiple nested conductive pipes and lower frequencies can be used to inspect outer pipes of the multiple nested conductive pipes. Alternatively, EM induction tools can operate in time-domain (TD) by transmitting transient pulses and measuring the decay response versus time. Earlier time responses correspond to inner pipes and later time responses correspond to outer pipes. These tools are referred to as pulsed eddy current corrosion detection tools.

In frequency-domain eddy current (EC) techniques on multiple nested conductive pipes, a transmitter coil can be fed by a continuous sinusoidal signal, producing primary fields that irradiate the pipes. The primary fields produce Eddy currents in the pipes. These Eddy currents, in turn, produce secondary fields that are sensed along with the primary fields with the receiver coils that are placed further away from the transmitter, as shown in FIG. 1A. Receivers should be placed far enough from the transmitter so that the secondary field does not get masked by the primary field. Receivers with longer spacings are more sensitive to outer pipes than receivers with shorter spacings. Characterization of the pipes can be performed by measuring and processing these measured fields.

In time-domain EC techniques, also referred to as pulsed EC (PEC) techniques, the transmitter is fed by a pulse. Similar to the frequency-domain technique, transient primary fields are produced due to the transition of the pulse from off to on state or from on to off state, which is more common. These transient fields produce eddy currents in the multiple nested conductive pipes. The eddy currents then produce secondary magnetic fields that can be measured by either a separate receiver coil placed further away from the transmitter; a separate receiver coil collocated with the transmitter; or the same coil that was used as the transmitter.

Figure 1B:
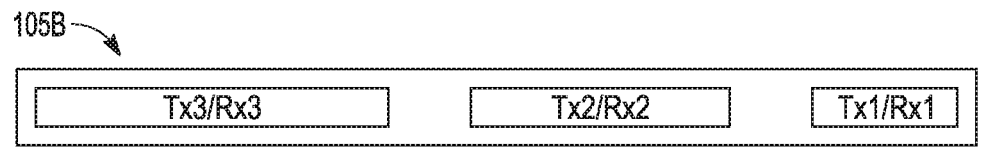
FIG. 1B is a schematic of a tool comprising multiple arrays of collocated transmitters/receivers, which configuration can be used in time-domain tools, in accordance with various embodiments.

FIGS. 1A and 1B are representations of spaced versus collocated transmitter/receiver corrosion detection tools. FIG. 1A is a schematic of a tool 105-A with 1 transmitter, Tx, and multiple receivers, Rx1, Rx2, Rx3, Rx4, Rx5, Rx6, spaced from the transmitter Tx. The number of multiple receivers may be different from the six receivers shown. This configuration can be used in time-domain and frequency-domain tools. FIG. 1B is a schematic of a tool 105-B comprising 3 arrays, Tx1/Rx1, Tx2/Rx2, and Tx3/Rx3 of collocated transmitters/receivers. The arrays are known as the short array, medium array, and long array. Arrays with different lengths have different sensitivity to different pipes. The longer array is more sensitive to outer pipes and the shorter array is more sensitive to inner pipes. This configuration can be only used in time-domain tools.

Measurements made at different frequencies, or alternatively at different times in the time-domain response, and different receivers can be jointly processed using model-based inversion to determine the thickness and the magnetic permeability of each pipe. Alternatively, RFEC processing can be used to estimate the total thickness of the pipes in real-time.

Figure 2:
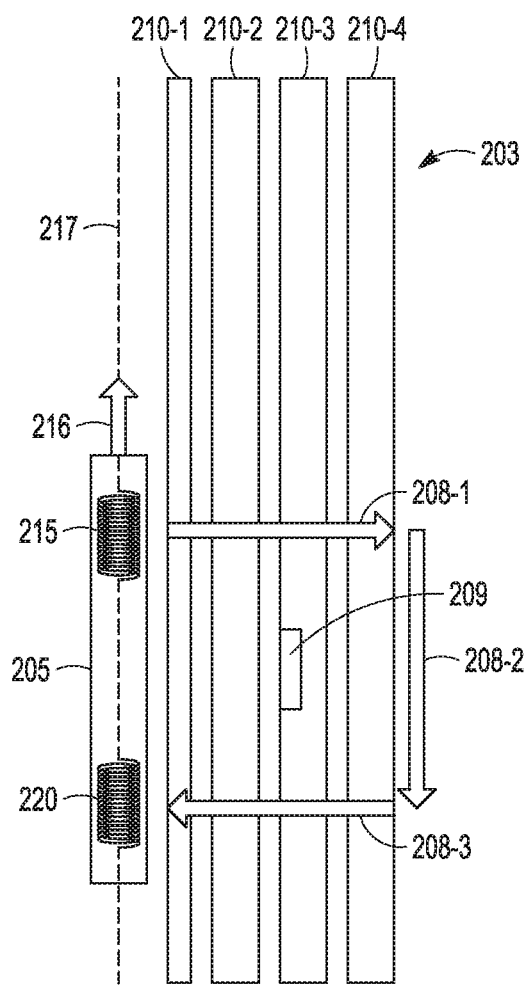
FIG. 2 is an illustration of a remote field eddy current measurement in which a cross-sectional representation of logging in a nested conductive pipe structure is shown, in accordance with various embodiments.

As illustrated in FIG. 2, RFEC is generated by signals that penetrate through the pipes walls, travel along the outside of the pipes, then back through the walls to the inside of the pipes. In this regime, the phase, $\phi$, of the mutual impedance between transmitter and receiver is linearly proportional to the total thickness of the pipes, that is $$\phi \propto 2d/\delta \quad (1)$$

and the magnitude of the impedance shows the dependence:

$$\exp(-2d/\delta) \quad (2)$$

where d is the overall thickness of the pipes and $\delta$ is the skin-depth $$\delta = \sqrt{\frac{2}{\omega\mu\sigma}} \quad (3)$$

where $\omega$ is the angular frequency of the excitation source, $\mu$ is the magnetic permeability of the pipe, and $\sigma$ is the electrical conductivity of the pipe. This regime, where the phase of the mutual impedance between transmitter and receiver is linearly proportional to the total thickness of the pipes, is referred to as the RFEC regime.

RFEC therefore provides means for real-time estimation of the total thickness of the pipes, once the linear phase relationship is determined. The proportionality constant in equation (1) depends on the nominal thickness of the pipes, the diameters of the pipes, their magnetic permeability, and their electrical conductivity. All these parameters can be determined either from a priori information of the dimensions and material of pipes used in the given well, or from a calibration procedure. In RFEC processing, the distinction between phase variations due to thickness change and those due to permeability variations cannot be made. RFEC is therefore an approximate method for estimating the thickness, which is accurate only when permeability variations along the pipes are small.

The frequency used in the RFEC regime should be low enough so that the majority of the signal measured at the receiver comes from signals that penetrate through the pipes walls, travel along the outside of the pipes, then back through the walls to the inside of the pipes as opposed to the direct signal coupled axially within the innermost pipe or those reflected off the inner walls of the pipes. Conventionally, RFEC was associated with the transmitter and the receiver being separated by one or two times the diameter of the outermost pipe so that the RFEC signal dominates over the direct signal at the receiver, and therefore the application of RFEC processing was restricted to tools with separated transmitters and receivers.

FIG. 2 is an illustration of a RFEC measurement. FIG. 2 is a cross-sectional representation of logging in a nested conductive pipe structure 203, where only one side of the nested conductive pipe structure 203 is shown, for convenience. A low frequency signal from a transmitter 215 of a tool 205 penetrates the pipes walls 210-1, 210-2, 210-3 and 210-4 of nested conductive pipe structure 203 and decays slowly outside the pipes. Though the conductive pipe structure 203 is shown having 4 pipes in number, the number of pipes can be different from 4. The main flow of energy reaching a receiver 220 at large offset goes through the pipes walls (indicated by the arrow 208-1), along the outside of the nested conductive pipe structure 203 (indicated by the arrow 208-2), then back through the walls to the inside of the pipes (indicated by the arrow 208-3). Frequencies used in this regime are below the cutoff frequency of the innermost pipe, so the direct signal attenuates rapidly within the innermost pipe. The tool 205 can be pulled along the axis 217, to make measurements at different depths of the nested conductive pipe structure 203 and a log of these measurements can be formed. Arrow 216 indicates that the tool 205 is being moved from a bottom region of the nested conductive pipe structure 203 upward in this example. The axis 217 may be a longitudinal axis of the nested conductive pipe structure 203. The axis 217 may be a longitudinal axis of the tool 205. The axis 217 may be a longitudinal axis of the nested conductive pipe structure 203 that is also a longitudinal axis of the tool 205. The tool 205 can be moved along the longitudinal axis 217 using conventional mechanisms of the oil and gas industry, such as but not limited to, wireline operations, slickline operations, coiled tubing operations, drill pipe operations, downhole tractor operations, or other appropriate operations. Arrow 216 indicates the direction of this movement.

In the EC techniques, when the transmitter 215 and receiver 220 are separate coils placed at different positions along the depth, the peak of response change due to a defect 209 can be observed twice in the log. This effect is referred to as a ghost effect, also is referred to as double indication of defects. The ghost effect is observed more often when inspecting the outer pipes in multiple pipe inspection scenarios, since larger transmitter-receiver distances allow for better characterization of those pipes. This double peak effect happens due to the fact that during the logging process the defects produce two maximum changes in the responses: once when the transmitter 215 is passing the defected region 209 and another time when the receiver 220 is passing the defected region 209. See FIGS. 3A-3D, for example.

Even though different methods have been disclosed for mitigating the ghost effect such as using a plurality of symmetrically situated receivers on opposing sides of a transmitting coil as disclosed in U.S. Pat. No. 8,958,989B2, collocated transmitters and receivers remain an appropriate choice for time-domain tools, since the collocated architecture is inherently free from the ghost effect. To date, the only way time-domain data from collocated transmitter and receivers are processed is through model-based inversion. In various embodiments, techniques taught herein include a fast processing method that is based on RFEC (or quasi-RFEC) and that can estimate the total thickness of the pipes from time-domain measurements made by collocated transmitters and receivers in real-time.

Figure 3A:
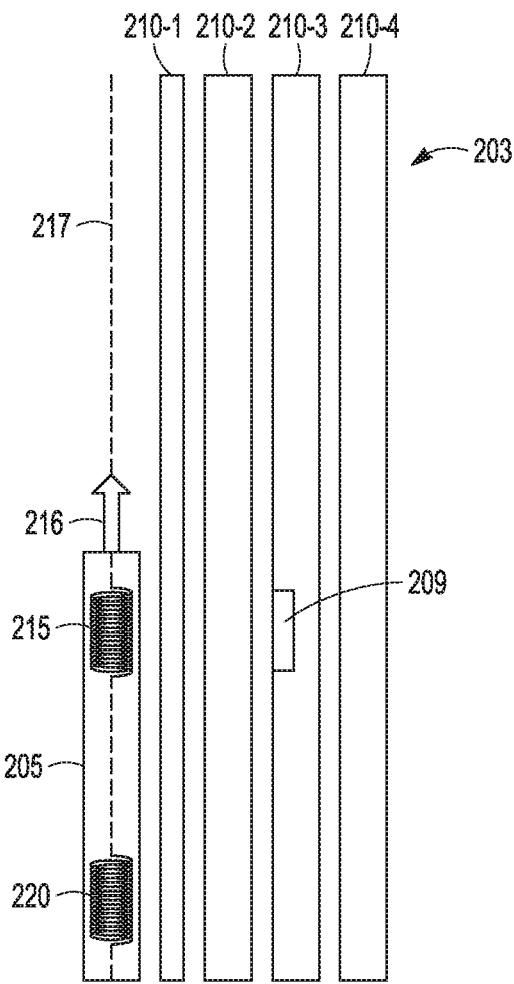
FIGS. 3A-3D is an illustration of the ghost effect in eddy current inspection of the pipes when the transmitter and receiver are separate coils with a large distance between them, in accordance with various embodiments.
Figure 3B:
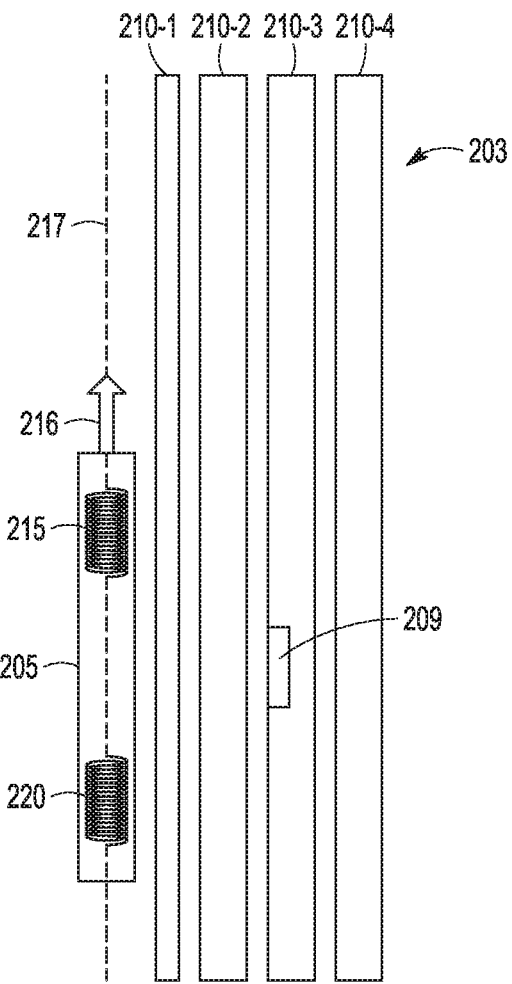
Figures 3C, 3D:
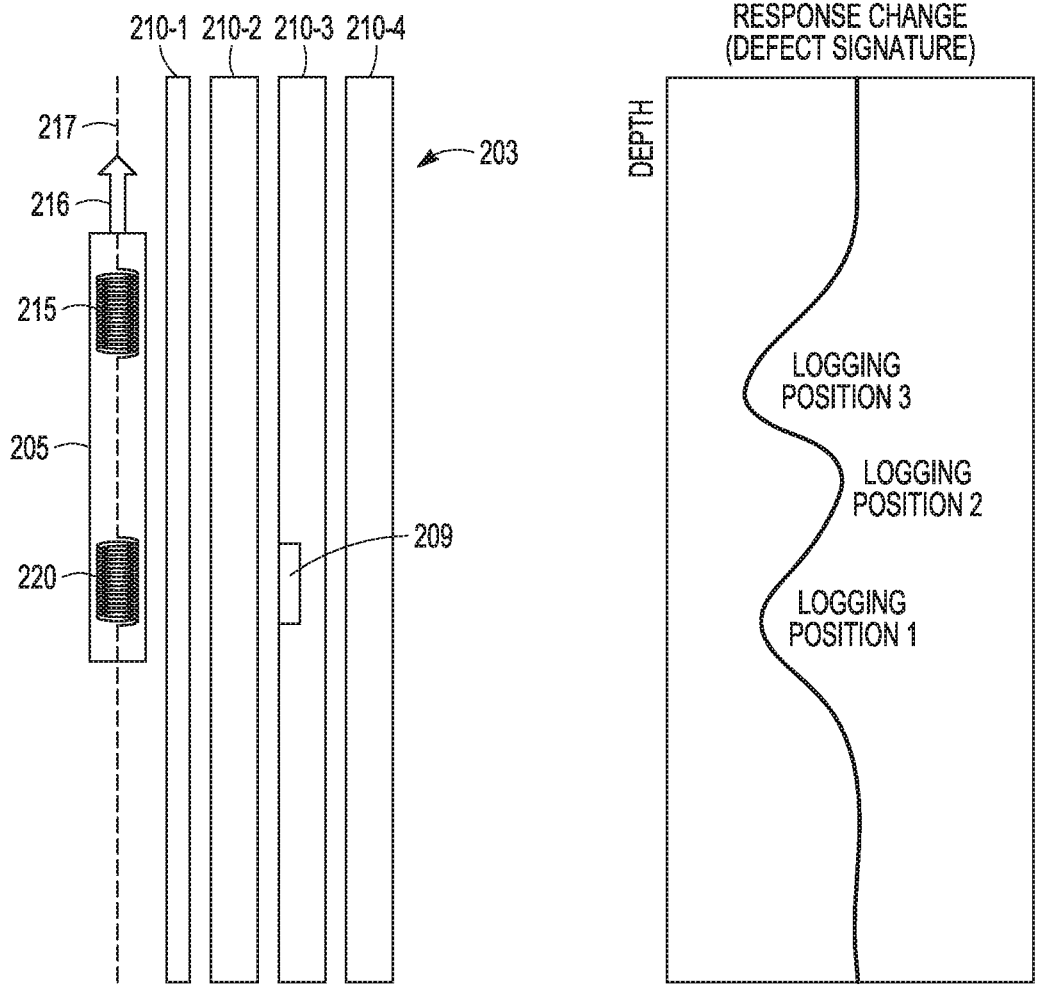

FIGS. 3A-3D illustrate the ghost effect in eddy current inspection of the pipes 210-1, 210-2, 210-3, and 210-4 of the multiple nested conductive pipes structure 203, when the transmitter 215 and the receiver 220 of the tool 205 are separate coils with a large distance between them. FIG. 3A shows a logging position 1 in a logging by the tool 205 along the axis 217 in the direction 216. FIG. 3B shows a logging position 2 in the logging by the tool 205 along the axis 217 in the direction 216. FIG. 3C shows a logging position 3 in the logging by the tool 205 along the axis 217 in the direction 216. FIG. 3D shows a ghost effect with respect to the defect 209. The response change, which may be referred to as the defect signature, due to the defect 209 has two peaks: one corresponding to the logging position 1 where the transmitter is in front of the defected region 209, and the other one corresponding to logging position 3 where the receiver is in front of the defected region 209.

Figure 4:
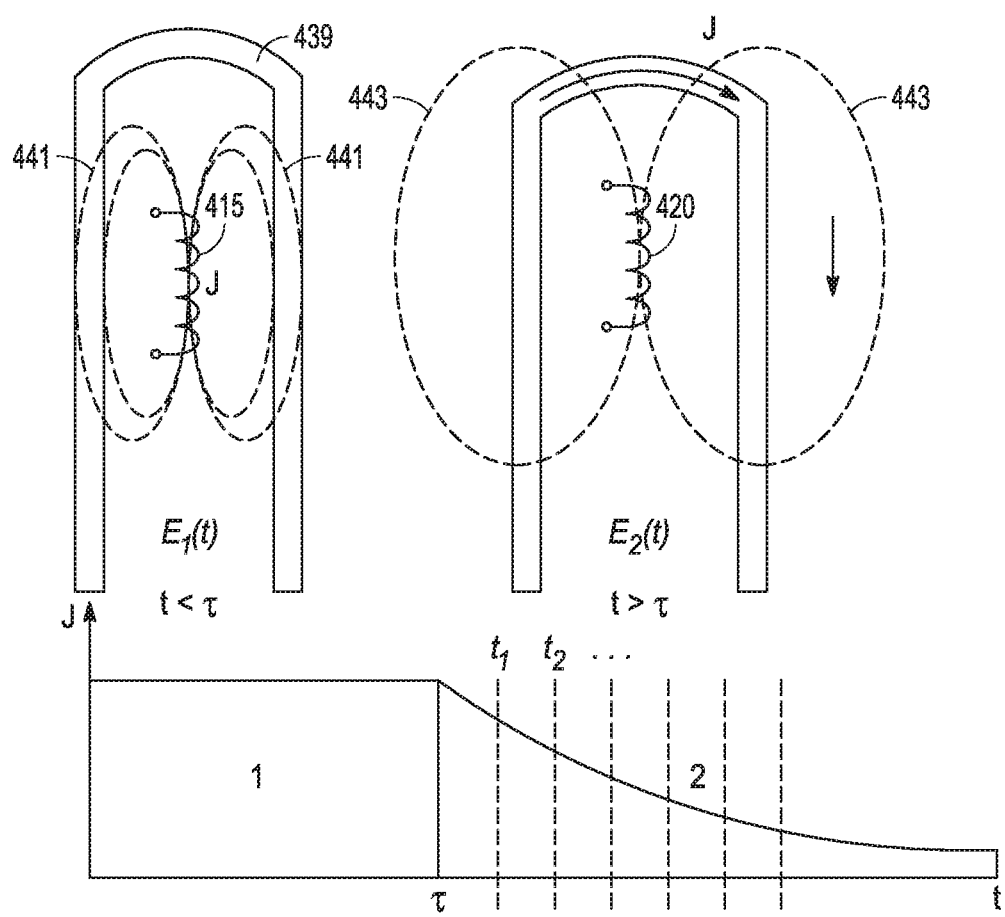
FIG. 4 is a representation of a transient model for the field components in a pipe, in accordance with various embodiments.
Figure 5A:
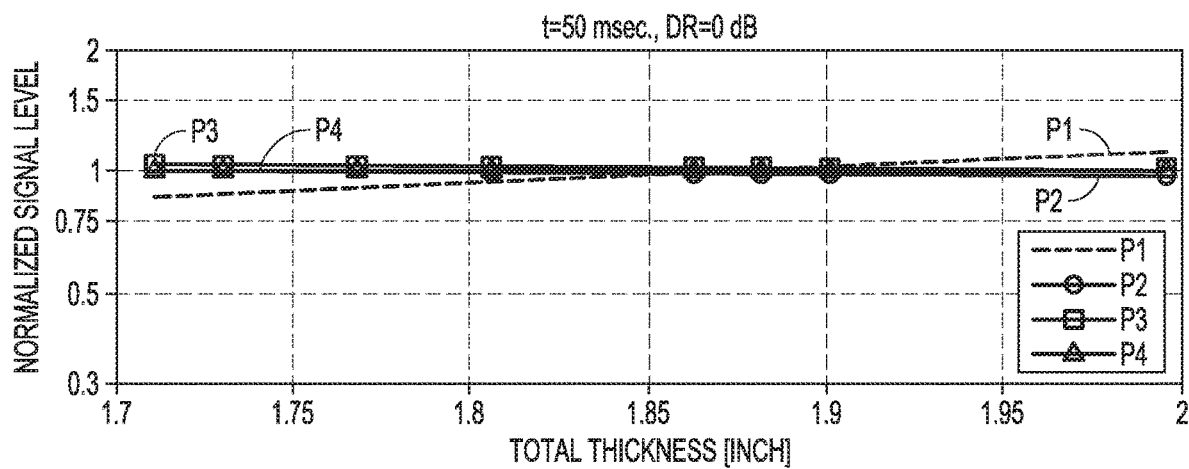
FIGS. 5A-5F are measured signals, normalized to the nominal signal level, at different times in a decay response plotted versus total thickness of the pipes, in accordance with various embodiments.
Figure 5B:
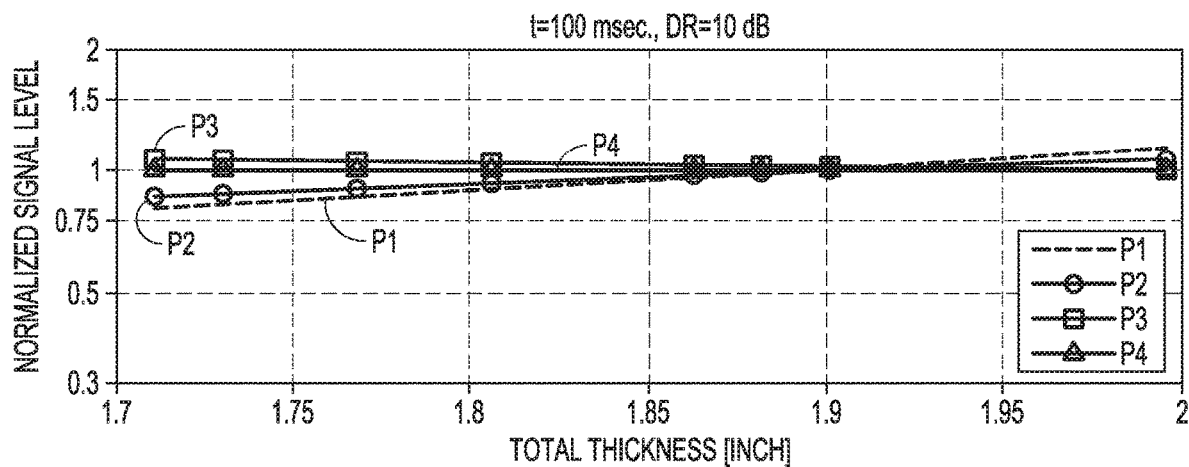
Figure 5C:
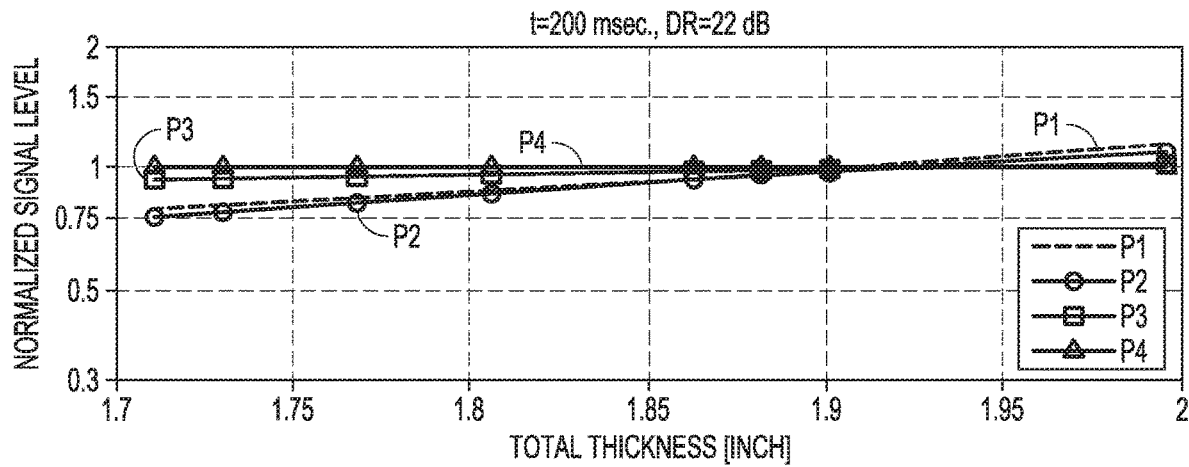
Figure 5D:
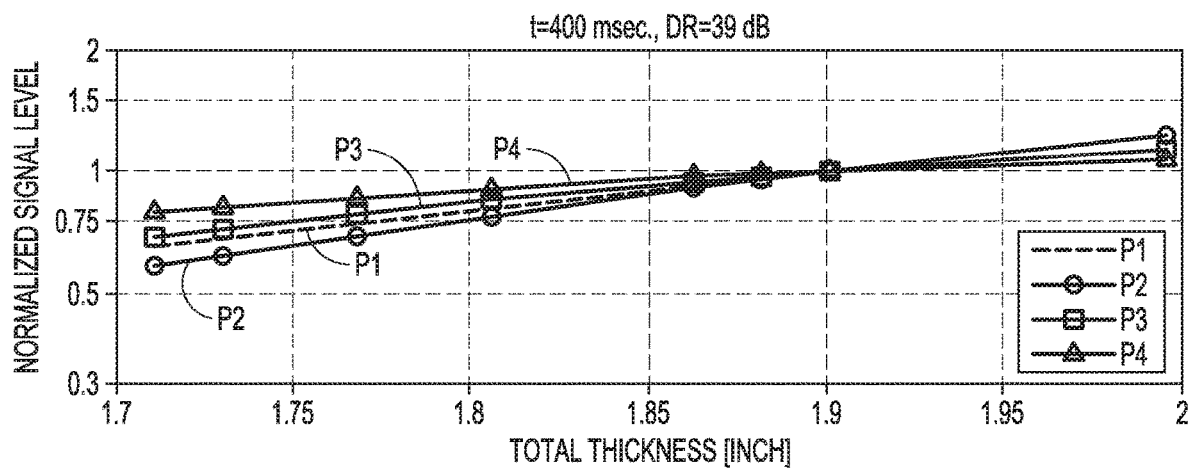
Figure 5E:
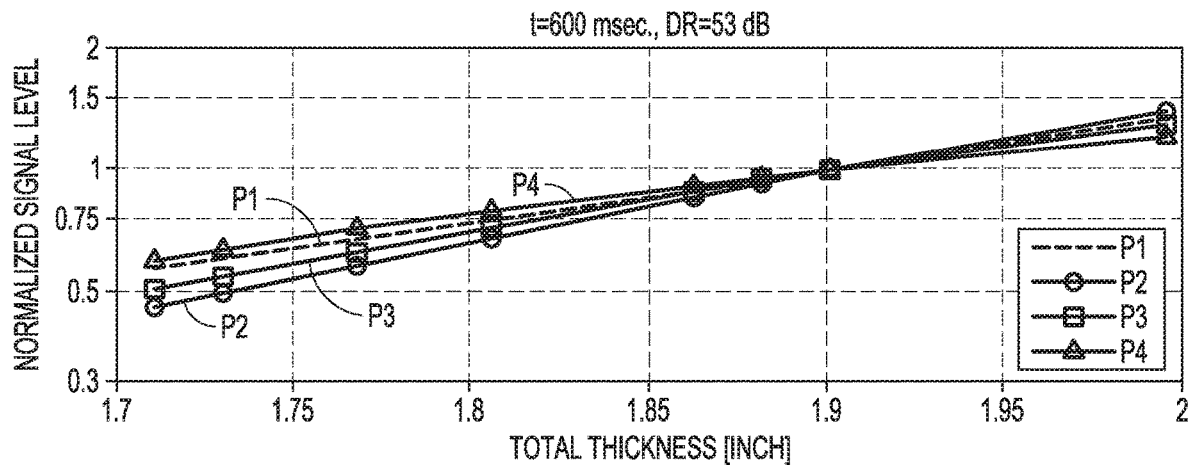
Figure 5F:
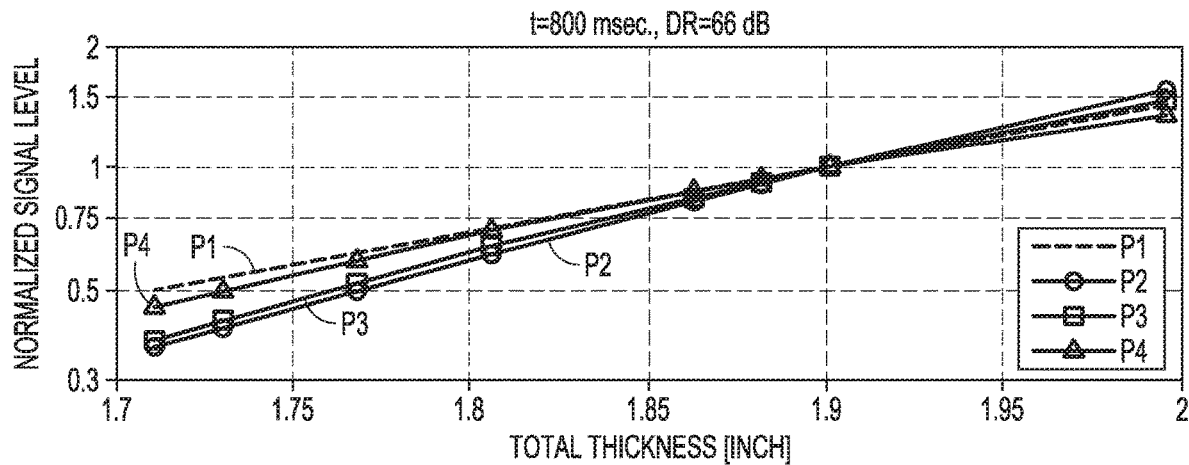

Consider RFEC in time-domain tools with collocated transmitters and receivers. The principle of operation of pulsed eddy current tools is illustrated in FIG. 4, which is a representation of a transient model for the field components in a pipe. A transmitter 415 produces a transient primary field component 441. The primary field component 441 produces eddy currents in a pipe 439. These eddy currents generate a secondary field component 443, which is measured by the receiver coil 420. The strength of the secondary field decays versus time. The decay response is sampled at different time instants, after the transmitter 415 is turned off at time τ. The strength of the response at different times is sensitive to the parameters of different pipes. For example, early times are more sensitive to innermost pipes, whereas late times are sensitive to both inner and outer pipes.

The decay response can be used to estimate the overall thickness of the pipes by RFEC processing, if there exists a time instant at which the decay response satisfies the following two criteria: 1) there exists a one-to-one relationship between measured signal level and the overall thickness of the pipes, and 2) the one-to-one relationship is unique independent of which pipe is defected.

FIGS. 5A-5F are plots of signal level at different time instants in the decay response. In FIGS. 5A-5F, measured signal at different times in the decay response are normalized to a nominal signal level and plotted versus the total thickness of the pipes. The signal level is plotted versus the total thickness of the pipes. Each of the 4 curves, designated as P1, P2, P3 and P4, corresponds to one pipe changing in thickness at a time. The nominal signal level corresponds to the nominal total thickness of 1.9 inches in this example. Thickness larger than the nominal thickness may correspond to the presence of collars. The dynamic range (DR) defined as the ratio between the nominal measurement at 50 msec and the nominal measurement at each time is given in the title of each plot. Transmitter and receiver coils used in this example are 40 inches long.

Nominal parameters of the pipes used in this example are summarized in Table 1, and the electrical conductivity of all pipes=$0.4 \times 10^7$ S/m. It is observed that at later time instants, the signal level becomes less sensitive to which pipe is causing the change in the total thickness. In this example, at times greater than 600 msec, the relationship between the signal level and the total thickness can be represented by a unique curve (a nominal look-up curve) and an upper and lower boundary curves as shown in FIG. 6.

TABLE 1

|  | Pipe | | | |
| --- | --- | --- | --- | --- |
|  | 1 | 2 | 3 | 4 |
| OD [in.] | 2 + 7/8 | 5 | 9 + 5/8 | 13 + 3/8 |
| Thickness [in.] | 0.217 | 0.625 | 0.545 | 0.514 |
| Relative Magnetic Permeability | 62 | 60 | 58 | 82 |

Figure 6:
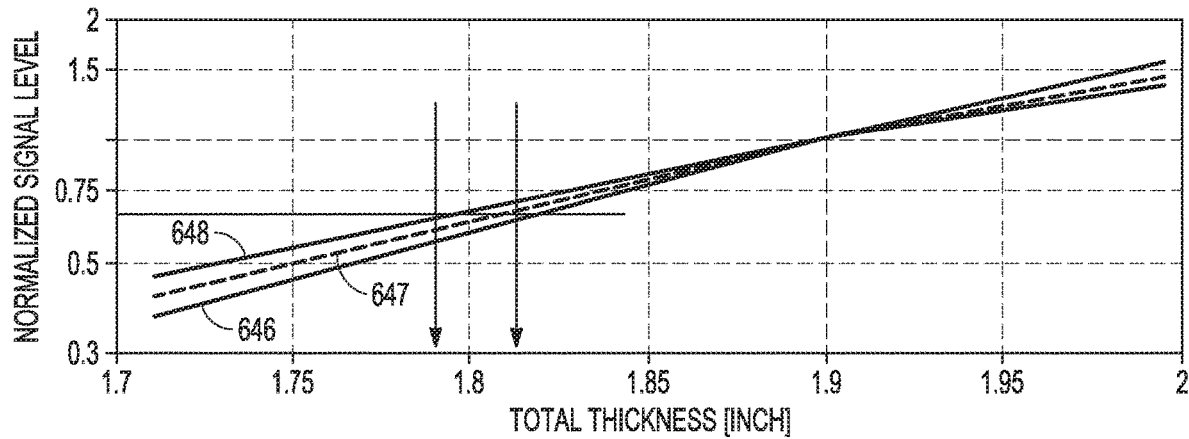
FIG. 6 is a plot of the normalized signal level and associated boundary curves versus the total thickness of the pipes, in accordance with various embodiments.

FIG. 6 is a plot of the normalized signal level and associated boundary curves versus the total thickness of the pipes. The total thickness of the pipes is estimated from the RFEC look-up curve 647 at 800 msec. The estimated thickness for any given signal level is associated with a confidence interval determined by the boundary curves 646 and 648. In the shown example, a normalized signal level of 0.625 would correspond to a total thickness of 1.8±0.0125 inches. The maximum error in estimating the total thickness is therefore 0.69%.

A total thickness of 1.8 inches corresponds to thickness loss of 0.1 inches. The maximum error in estimating the thickness loss is therefore 12.5%.

For a given signal level, the nominal look-up curve, curve 647 in FIG. 6, for example, can be used to determine the corresponding overall thickness of the pipes. The boundary curves can be used to determine the maximum error (uncertainty) in total thickness estimation associated with any given signal level. Ideally, in perfect RFEC regime, the boundary curves would collapse to the nominal look-up curve giving rise to a unique relationship between signal level and total thickness. In tools with collocated transmitter and receiver, perfect RFEC regime might not be achievable; rather, a quasi-RFEC regime can be obtained in which the uncertainty in total thickness estimation is sufficiently low, as shown in FIG. 6.

Upper and lower boundary curves correspond to pipes for which changes in thickness result in the highest and lowest signal levels, respectively. The nominal look-up curve corresponds to either the case in which a given thickness change is equally distributed among all pipes, or chosen to be mid-way between lower and upper boundary curves to ensure symmetric −/+ errors. Lookup curves for each pair of the transmitters and receivers can be constructed to determine which pair is most usable for the remote field eddy current lookup. In an embodiment, a criterion for remote field eddy current processing can be related to signals that are insensitive to the individual thicknesses of each one of the pipes of a nested multi-pipe structure but is sensitive to the total thickness.

Figure 7:
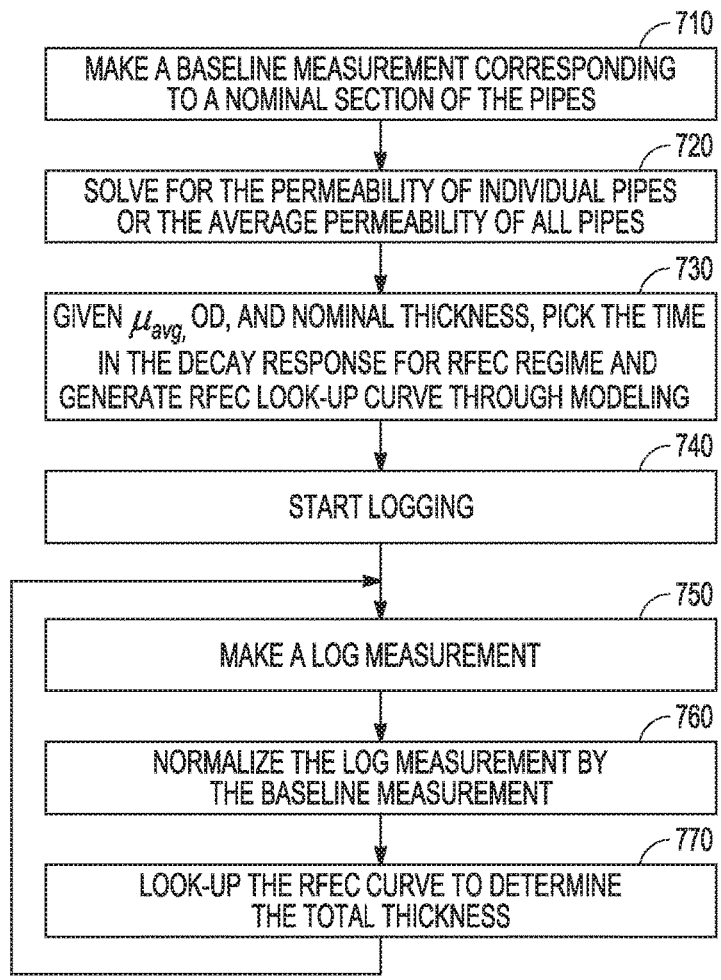
FIG. 7 is a flow diagram of features of a method to compute a remote field eddy current nominal look-up curve and the boundary curves using one baseline measurement and modeling, in accordance with various embodiments.

FIG. 7 is a workflow for computing the RFEC nominal look-up curve and the boundary curves using one baseline measurement and modeling. At 710, a baseline measurement that corresponds to all pipes having their nominal thicknesses is made. That measurement can be obtained by averaging out a long enough log to minimize the effect of any present defect, or by inspecting raw data and determining an appropriate non-defected section. In an embodiment, a different baseline measurement may be selected for each joint of pipe. In another embodiment, a baseline that is calculated from a joint of pipe can be used to evaluate another joint of pipe. A histogram of the received signal within each joint of pipe can be used to identify the baseline as the peak in the histogram.

At 720, the permeability of individual pipes or the average permeability of all pipes may be solved. Given the nominal thickness of the pipes and their outer diameters (ODs), which can be assumed to be known a priori from available information about the well casings, an inversion problem can be solved to match the baseline response to a synthetic response computed using a computer-based model. This procedure involves calibrating the baseline response measured by the tool to that predicted by the computer model. Use of prior knowledge of the nominal thickness of the pipes can be made to calibrate corrosion detection tools. In such a procedure, real-valued calibration constants $W_{cal}$ and an average effective permeability $\mu_{avg}$ for all pipes can be estimated through a constrained optimization procedure to minimize the misfit between the baseline measurement $m_{bl}$ and a synthetic response $s_{bl}$ computed using a computer model. Note that, unlike the nominal thickness and the OD, the permeability of any given pipe is not known a priori as it may vary significantly along the pipe. Typically, the relative permeability of pipes used in well casing can range from 1-120.

An example of a cost function that can be used in computing the calibration constants and the average effective permeability is given by equation (4). Here, the cost function is equal to the misfit computed as the L2 norm of the weighted difference between observed and predicted data.

$$f_{TD}(W_{cal}, \mu_{avg}) = \left\| W_m \times \left[ \frac{s_{bl}(\mu_{avg})}{W_{cal}m_{bl}} - 1 \right] \right\|_2^2 \quad (4)$$

Different quantities in the above equation are defined as follows:

$m_{bl}$: vector of M real-valued baseline measurements at different time slots and receivers, where $M=N_{Rx} \times N_{TS}$, where $N_{Rx}$ is the number of receivers and $N_{TS}$ is the number of time samples in the decay response.

$s_{bl}(\mu_{avg})$: vector of M forward model responses for pipes with nominal thickness and effective permeability $\mu_{avg}$.

$W_m$: measurements weights matrix, an M×M diagonal matrix. It is used to assign different weights to different measurements based on the relative quality or importance of each measurement.

$W_{cal}$: M×M diagonal matrix of real-valued calibration constants.

At 730, given $\mu_{avg}$, OD, and nominal thickness, time in the decay response for RFEC regime can be picked and a RFEC look-up curve can be generated through modeling. Having estimated $\mu_{avg}$ from the calibration procedure, a computer model can be run to generate curves for the predicted signal level at different times in the decay response versus the total thickness, similar to the curves in FIGS. 5A-5F. From these curves, the onset of the RFEC regime is determined, for example 600 msec in the example shown in FIG. 5. The nominal look-up curve and boundary curves can also be computed in this procedure, as shown in FIG. 6.

It is observed, from FIG. 6, that the RFEC look-up curve and the boundary curves can each be described as an exponential relationship of the form $y=e^{Ax+B}$ between the signal level y and the total thickness x. Note that the y-axis in FIG. 6 is in log scale. This means that each curve can be uniquely identified using at least two points. One point can be the nominal thickness at which the normalized signal level equals one. The second point can be chosen at the minimum total thickness expected to be encountered. The signal level corresponding to that point can be computed through modeling. The look-up curve together with the boundary curves can therefore be computed by running a number of simulations equal to the number of pipes.

At 740, logging is started, and at 750, a log measurement is made. At 760, the log measurement is normalized by the baseline measurement. At 770, the total thickness is determined by a look-up of the RFEC curve. As the tool logs the pipes, the total thickness of the pipes at each logging point can be estimated in real-time by simply looking-up the RFEC look-up curve as shown in FIG. 6. No more inversion is needed.

Figure 8:
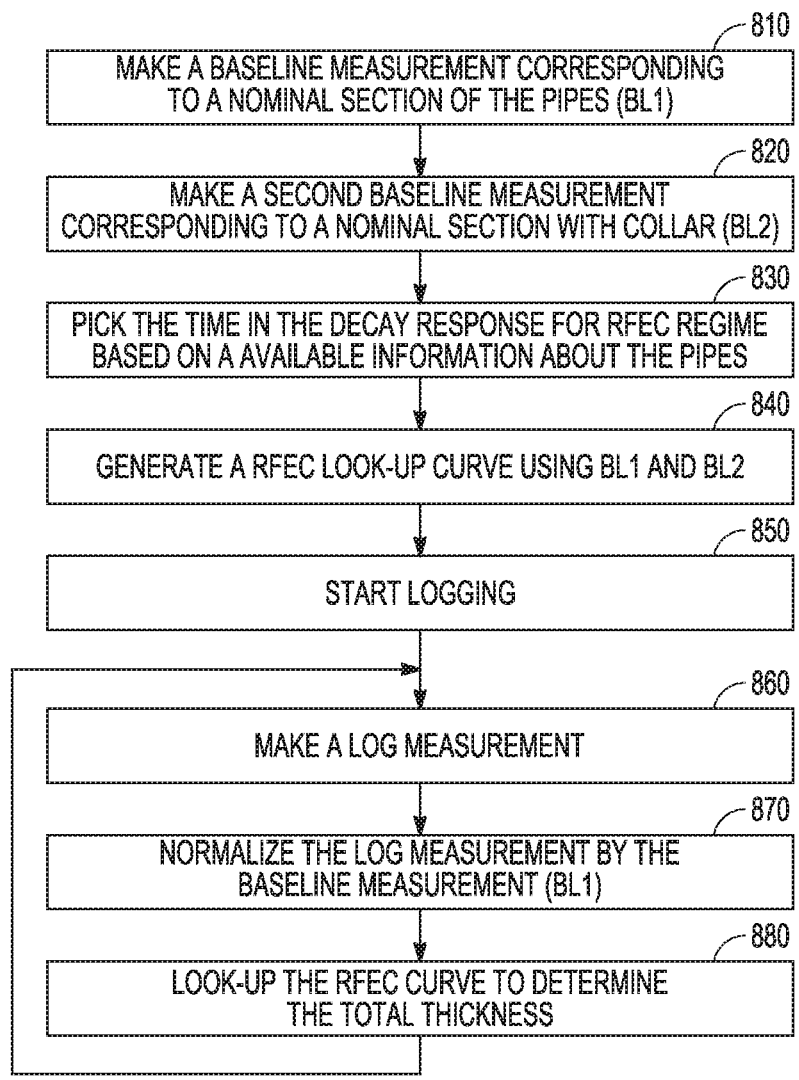
FIG. 8 is a flow diagram of features of a method to estimate a remote field eddy current look-up curve using two baseline measurements, in accordance with various embodiments.

In an embodiment, the RFEC look-up curve can be approximately estimated from two baseline measurements, obviating a need for the calibration procedure and a need for running the computer model to obtain the look-up curve. FIG. 8 is a workflow for estimating the RFEC look-up curve using two baseline measurements. At 810, a baseline measurement corresponding to a nominal section of the pipes is made, providing a first baseline point BL1. The first point can be the nominal thickness at which the normalized signal level equals one.

At 820, a second baseline measurement, corresponding to a section with a collar, is made, providing a second baseline point BL2. The second point can be chosen at a location where the total thickness is different than the nominal but at the same time is known from an independent measurement. This could be a section with casing coupler (collar) on one of the pipes. Locations of the casing couplers can be determined by running a casing collar locator (CCL) tool either in the same tool string as the corrosion detection tool or in a separate log before running the corrosion detection tool. The thickness of the collar is assumed to be known through available information on the well design. However, in this embodiment, the boundary curves needed to estimate the uncertainty cannot be determined.

At 830, a time in the decay response for RFEC regime is picked based on available information about the pipes. At 840, a RFEC look-up curve is generated using BL1 and BL2. At 850, logging is started, and at 860, a log measurement is made. At 870, the log measurement is normalized by the baseline measurement BL1. At 880, the total thickness is determined by a look-up of the RFEC curve. By examining the decay response at different times, the thickness of individual pipes can be determined.

Figure 9:
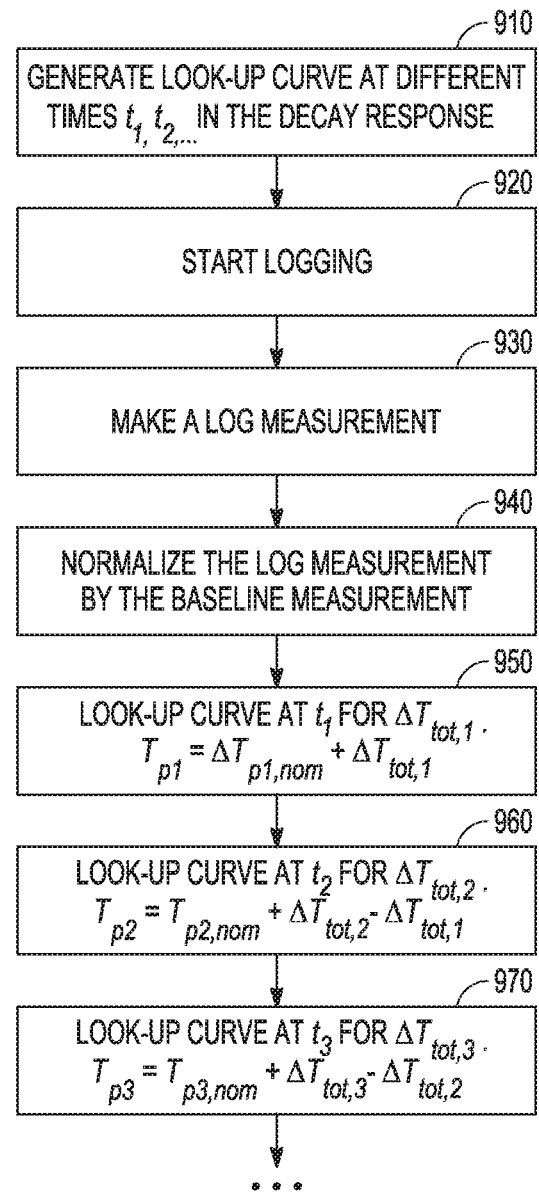
FIG. 9 is a flow diagram of features of a method to estimate the thickness of individual pipes using multiple look-up curves at different times in a decay response, in accordance with various embodiments.

FIG. 9 is a workflow for estimating the thickness of individual pipes using multiple look-up curves at different times in the decay response. At 910, following the calibration procedure, look-up curves at different times $t_1, t_2, \ldots$ in the decay response can be generated. Such generation can be conducted through modeling. An example for this is shown in FIGS. 5A-5F. As can be observed in FIGS. 5A-5F, responses at different times are sensitive to different number of pipes. For example, the response at 50 msec is only sensitive to pipe 1, which can be indicated as $t_1$. The response at 200 msec is almost equally sensitive to both pipes 1 and 2, which can be indicated as $t_2$. The response at approximately 400 msec is almost equally sensitive to pipe 1 through 3, which can be indicated as $t_3$. The response at 600 msec and later is almost equally sensitive to all pipes, which can be indicated as $t_4$.

At 920, logging is started, and at 930, a log measurement is made. At 940, the log measurement is normalized by the baseline measurement. At 950, the RFEC look-up curve is accessed at $t_1$ for $\Delta T_{tot,1}$. The response at $t_1$ is used to determine the thickness of pipe 1 as follows:

$$T_{p1} = T_{p1,nom} + \Delta T_{tot,1} \qquad (5)$$

where: $T_{p1}$ is the thickness of pipe 1.

$T_{p1,nom}$ is the nominal thickness of pipe 1.

$\Delta T_{tot,1}$ is the change in total thickness from the nominal total thickness as estimated from the look-up curve at $t_1$.

At 960, the RFEC look-up curve is accessed at $t_2$ for $\Delta T_{tot,2}$. Then, t2 is used to estimate the thickness of pipe 2 as follows:

$$T_{p2} = T_{p2,nom} + \Delta T_{tot,2} - \Delta T_{tot,1}. \qquad (6)$$

At 970, the RFEC look-up curve is accessed at $t_3$ for $\Delta T_{tot,3}$. Then, t3 is used to estimate the thickness of pipe 3 as follows:

$$T_{p3} = T_{p3,nom} + \Delta T_{tot,3} - \Delta T_{tot,2} - \Delta T_{tot,1}, \qquad (7)$$

and so on for other pipes.

An advantage of this workflow over model-based inversion approach is that here the thickness of individual pipes can be determined sequentially by running forward modeling as few times as the number of pipes. Forward modeling relates to determining a response with respect to a physical property model. In model-based inversion, the thickness of all pipes is determined simultaneously together with the effective permeability of each pipe, which requires running forward modeling many times during the numerical optimization process.

Consider coil length and dynamic range for a RFEC regime. Table 2 shows the dynamic range required to make a measurement at any given time in the decay response relative to the signal level at 50 msec for tools with different transmitter/receiver coil length. Dynamic range in [dB], defined as the ratio between the nominal measurement at 50 msec and the nominal measurement at later times, is shown for coils with different lengths. Depending on the number and the geometry of the pipes, RFEC regime may start at around 600 msec or later. The dynamic range should be in the range of 50-70 dB to operate in the RFEC regime. Longer coils can be used to relax a requirement on dynamic range, as shown in Table 2.

TABLE 2

|  |  | Time [msec] | | | | |
| --- | --- | --- | --- | --- | --- | --- |
|  |  | 100 | 200 | 400 | 600 | 800 |
| Coils | 10 inches | 13 | 27 | 46 | 60 | 74 |
| Length | 40 inches | 10 | 22 | 39 | 53 | 66 |
|  | 80 inches | 10 | 21 | 35 | 49 | 61 |

In various embodiments, a RFEC processing method for pulsed eddy current tools with collocated transmitters and receivers can be implemented. The pulsed eddy current tools can be pulsed eddy current corrosion detection tools with collocated transmitters and receivers. Such a method has distinctive features. Unlike conventional RFEC processing that requires transmitters and receivers to be separated by one or two times the diameter of the outermost pipe, techniques as taught herein can be applied to tools with collocated transmitters and receivers by appropriately choosing a time instant in the decay response at which the total thickness of the pipes can be estimated with high confidence level from the signal level. Such procedures can comprise a nominal look-up for estimating the total thickness of the pipes in real-time, as well as upper and lower boundary curves for determining the level of uncertainty in estimating the thickness. The look-up curves can be computed by running a model a number of times equal to the number of the pipes after the model had been calibrated to a baseline measurement. Alternatively, the look-up curves can be computed from two baselines measurements without having to run the model. The thickness of individual pipes can be estimated sequentially, starting from the innermost pipe, by looking up curves at increasing time instants.

Figure 10:
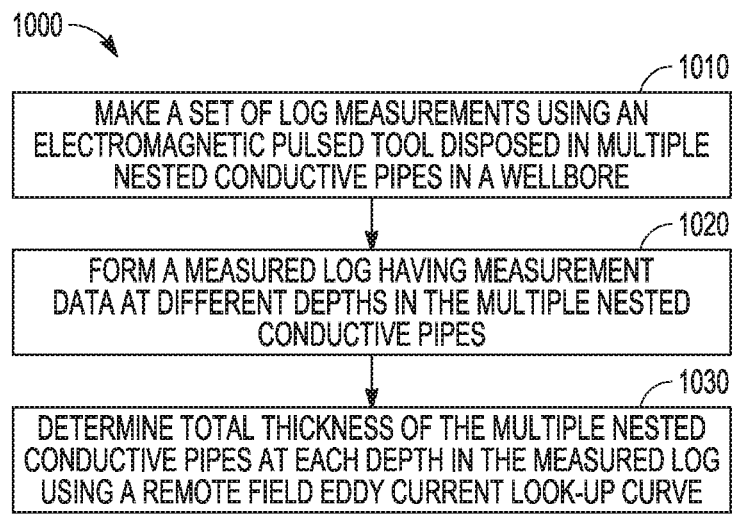
FIG. 10 is a flow diagram of features of an example method of determining thickness of multiple nested conductive pipes, in accordance with various embodiments.

FIG. 10 is a flow diagram of features of an embodiment of an example method 1000 of determining thickness of multiple nested conductive pipes. At 1010, a set of log measurements is made using an electromagnetic pulsed tool disposed in multiple nested conductive pipes in a wellbore. Using an electromagnetic pulsed tool can include using a transmitter coil and a receiver coil with the transmitter coil collocated with the receiver coil. At 1020, a measured log is formed having measurement data at different depths in the multiple nested conductive pipes. At 1030, total thickness of the multiple nested conductive pipes at each depth in the measured log is determined using a remote field eddy current look-up curve. The remote field eddy current look-up curve can be correlated to a remote field eddy current regime in time-domain associated with time decay response.

Variations of method 1000 or methods similar to method 1000 can include a number of different embodiments that may or may not be combined depending on the application of such methods and/or the architecture of systems in which such methods are implemented. Generating the remote field eddy current look-up curve can be realized by selecting a baseline measurement that corresponds to a nominal section of the multiple nested conductive pipes and estimating magnetic permeability and electrical conductivity of the multiple nested conductive pipes using the baseline measurement; determining a time instant in a decay response that corresponds to the remote field eddy current regime using the estimated magnetic permeability and electrical conductivity and known nominal thickness of the pipes of the multiple nested conductive pipes; and generating the remote field eddy current look-up curve using the time instant and using the estimated magnetic permeability and electrical conductivity and known nominal thickness of the pipes of the multiple nested conductive pipes. The time instant in the decay response that corresponds to the remote field eddy current regime can be a time instant in the decay response at which uncertainty in estimating the total thickness, using the look-up curve generated at that time instant and using a given signal level, is below a prescribed value. This value can be 5%, 10% or 20%, for example. In an embodiment, this defines the time instant in the decay response at which the total thickness of the pipes can be estimated with high confidence level from the signal level. Generating a remote field eddy current look-up curve may include computing the remote field eddy current look-up curve by running a model a number of times equal to the number of the pipes, after the model is calibrated to a baseline measurement. Generating a remote field eddy current look-up curve may include computing the remote field eddy current look-up curve from two baselines measurements without running a model.

Variations of method 1000 or methods similar to method 1000 can include embodiments in addition to generating the remote field eddy current look-up curve. Such embodiments can include generating a set of curves for predicted signal level at different times in a decay response versus the total thickness relationship using the time instant and using the estimated magnetic permeability and electrical conductivity and known nominal thickness of the pipes of the multiple nested conductive pipes; setting an upper boundary curve for the total thickness using a curve with a highest predicted signal level of the set; and setting a lower boundary curve for the total thickness using a curve with a lowest predicted signal level of the set. In addition, various of these embodiments can include determining a maximum error in total thickness estimation for a given signal level using the upper boundary curve and the lower boundary curve at the given signal level.

Variations of method 1000 or methods similar to method 1000 can include estimating thickness of individual pipes of the multiple nested conductive pipes using remote field eddy current look-up curves at increasing time instants. Estimating thickness of individual pipes of the multiple nested conductive pipes can include estimating the thickness of the individual pipes sequentially, starting from the innermost pipe. Such methods can include directing remedial operations with respect to the multiple nested conductive pipes in response to determining the total thickness of the multiple nested conductive pipes or estimating the thickness of individual pipes of the multiple nested conductive pipes.

In various embodiments, a non-transitory machine-readable storage device can comprise instructions stored thereon, which, when performed by a machine, cause the machine to perform operations, the operations comprising one or more features similar to or identical to features of methods and techniques described with respect to method 1000, variations thereof, and/or features of other methods taught herein such as associated with FIGS. 7-9. The physical structures of such instructions may be operated on by one or more processors. Executing these physical structures can cause the machine to perform operations comprising: making a set of log measurements using an electromagnetic pulsed tool disposed in multiple nested conductive pipes in a wellbore, and forming a measured log having measurement data at different depths in the multi-pipe structure; and determining total thickness of the multiple nested conductive pipes at each depth in the measured log using a remote field eddy current look-up curve, the remote field eddy current look-up curve correlated to a remote field eddy current regime in time-domain associated with time decay response. Execution of various instructions may be realized by the control circuitry of the machine. The instructions can include instructions to operate a tool or tools having sensors disposed in multiple nested conductive pipes in a wellbore to provide data to process in accordance with the teachings herein. The multiple nested conductive pipes may be realized as a multi-pipe structure disposed in a wellbore at a well site. Such machine-readable storage devices can include instructions to use an electromagnetic pulsed tool to include using a transmitter coil and a receiver coil with the transmitter coil collocated with the receiver coil.

The operations executed from the instructions can include generating the remote field eddy current look-up curve by selecting a baseline measurement that corresponds to a nominal section of the multiple nested conductive pipes and estimating magnetic permeability and electrical conductivity of the multiple nested conductive pipes using the baseline measurement; determining a time instant in a decay response that corresponds to the remote field eddy current regime using the estimated magnetic permeability and electrical conductivity and known nominal thickness of the pipes of the multiple nested conductive pipes; and generating the remote field eddy current look-up curve using the time instant and using the estimated magnetic permeability and electrical conductivity and known nominal thickness of the pipes of the multiple nested conductive pipes. The operations executed from the instructions may include generating the remote field eddy current look-up curve to include computing the remote field eddy current look-up curve by running a model a number of times equal to the number of the pipes, after the model is calibrated to a baseline measurement. The operations executed from the instructions may include generating the remote field eddy current look-up curve to include computing the remote field eddy current look-up curve from two baselines measurements without running a model.

Machine-readable storage devices can include instructions to perform operations that can include generating a set of curves for predicted signal level at different times in a decay response versus the total thickness relationship using the time instant and using the estimated magnetic permeability and electrical conductivity and known nominal thickness of the pipes of the multiple nested conductive pipes; setting an upper boundary curve for the total thickness using a curve with a highest predicted signal level of the set; and setting a lower boundary curve for the total thickness using a curve with a lowest predicted signal level of the set. The operations include determining a maximum error in total thickness estimation for a given signal level using the upper boundary curve and the lower boundary curve at the given signal level.

Machine-readable storage devices can include instructions to perform operations that can include estimating thickness of individual pipes of the multiple nested conductive pipes using remote field eddy current look-up curves at increasing time instants. Estimating thickness of individual pipes of the multiple nested conductive pipes can include estimating the thickness of the individual pipes sequentially, starting from the innermost pipe. Operations can include directing remedial operations with respect to the multiple nested conductive pipes in response to determining the total thickness of the multiple nested conductive pipes or estimating the thickness of individual pipes of the multiple nested conductive pipes.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 1135 of FIG. 11. While memory module 1135 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 11:
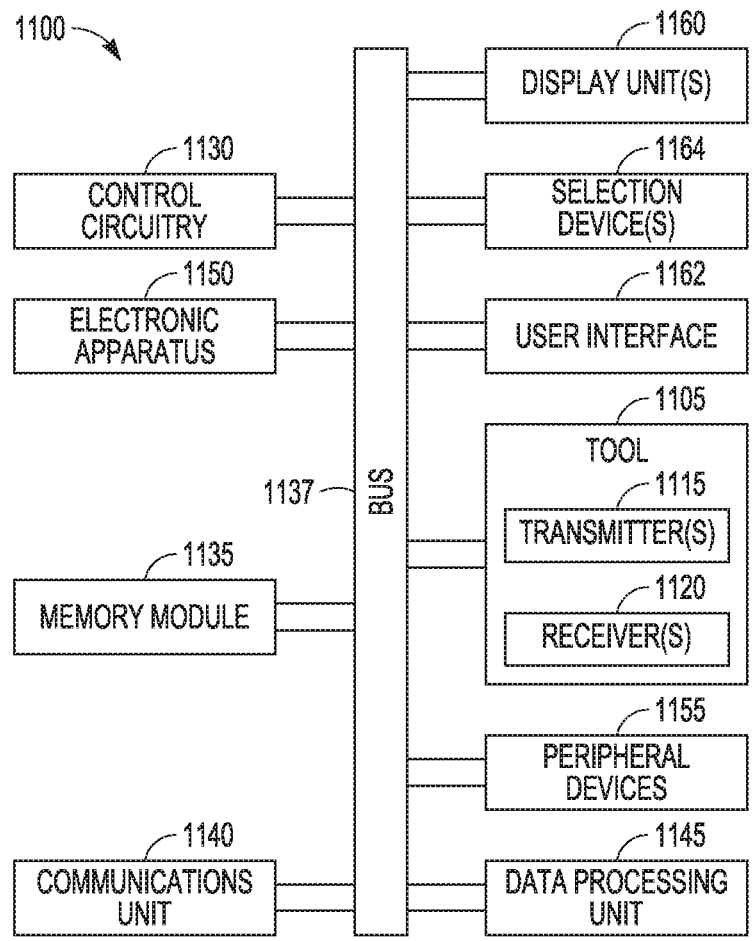
FIG. 11 is a block diagram of features of an example system operable to execute schemes associated with investigation of multiple nested conductive pipes, in accordance with various embodiments.

FIG. 11 is a block diagram of features of an embodiment of an example system 1100 operable to execute schemes associated with investigation of multiple nested conductive pipes. The system 1100 can be implemented at a well site to, among other things, determine thickness of multiple nested conductive pipes. The system 1100 may also be implemented to determine the thickness of the individual pipes of the multiple nested conductive pipes. Such thickness determination can be used to investigate defects in the multiple nested conductive pipes. The multiple nested conductive pipes may be a production structure of the well site.

The system 1100 can comprise a tool 1105 having one or more transmitters 1115 and one or more receivers 1120. The one or more transmitters 1115 and the one or more receivers 1120 can be realized as transmitter coils 1115 and receiver coils 1120. The tool 1105 can be realized as an electromagnetic pulsed tool having a transmitter coil 1115 and a receiver coil 1120 arranged such the receiver coil 1120 receives a secondary field in response to a primary field generated from the transmitter coil 1115. As noted, the transmitter coil 1115 may be part of a set of transmitter coils and the receiver coil 1120 may be part of a set of receiver coils. The transmitter coil 1115 and the receiver coil 1120 can be collocated on the tool 1105. The set of receivers 1120 and/or the set of transmitters 1115 can be arranged in a manner similar to or identical to arrangements as taught herein.

The tool 1105 may be operably disposed in the multiple nested conductive pipes being investigated in a wellbore. The tool 1105 can be moved along a longitudinal axis of the tool 1105 and/or a longitudinal axis of the multiple nested conductive pipes being investigated using conventional mechanisms of the oil and gas industry, such as but limited to, wireline operations. Features of the tool 1105 and variations thereof may be similar to or identical tools as discussed herein, for example tool 205 of FIG. 2.

The system 1100 can also comprise control circuitry 1130. The control circuitry 1130 can be arranged to control variable current levels to the set of transmitters to excite the selected ones of the pipes being invesigated. The control circuitry 1130 can be realized as one or more processors. In an embodiment, control circuitry 1130 can be realized as a single processor or a group of processors. Processors of the group of processors may operate independently depending on an assigned function. The control circuitry 1130 can be realized as one or more application-specific integrated circuits (ASICs). The control circuitry 1130 can be arranged to determine total thickness of the multiple nested conductive pipes and the thickness of individual pipes of the multiple nested conductive pipes based on the received responses at the receivers using RFEC processing as taught herein.

The control circuitry 1130, for example using one or more processors, can be arranged to evaluate the multiple nested conductive pipes in a wellbore from a set of log measurements acquired by use of the tool 1105 disposed in the multiple nested conductive pipes operable to form a measured log of measurement data at different depths in the multiple nested conductive pipes. The control circuitry 1130, for example using one or more processors, can be arranged to determine total thickness of the multiple nested conductive pipes at each depth in the measured log by use of a remote field eddy current look-up curve, where the remote field eddy current look-up curve is correlated to a remote field eddy current regime in time-domain associated with time decay response. The time decay response can be obtained from exciting the multiple nested conductive pipes with the transmitter 115 operating in a pulsed mode.

The control circuitry 1130, for example using one or more processors, can be arranged to generate the remote field eddy current look-up curve. The control circuitry 1130, for example using one or more processors, can be arranged to: select a baseline measurement that corresponds to a nominal section of the multiple nested conductive pipes and estimate magnetic permeability and electrical conductivity of the multiple nested conductive pipes based on the baseline measurement; determine a time instant in a decay response that corresponds to the remote field eddy current regime by use of the estimated magnetic permeability and electrical conductivity and known nominal thickness of the pipes of the multiple nested conductive pipes; and generate the remote field eddy current look-up curve by use of the time instant and use of the estimated magnetic permeability and electrical conductivity and known nominal thickness of the pipes of the multiple nested conductive pipes.

The control circuitry 1130, for example using one or more processors, can be arranged to compute the remote field eddy current look-up curve by performance of a run of a model a number of times equal to the number of the pipes, after the model is calibrated to a baseline measurement. The control circuitry 1130, for example using one or more processors, can also be arranged to compute the remote field eddy current look-up curve from two baselines measurements without a run of a model. The control circuitry 1130, for example using one or more processors, can be arranged to select the procedures to compute the remote field eddy current look-up curve. This selection can be conducted with logic circuitry, stored instructions, and/or switching circuitry as part of or accessible to the control circuitry 1130.

The control circuitry 1130, for example using one or more processors, can be arranged to generate a set of curves for predicted signal level at different times in a decay response versus the total thickness relationship by use of the time instant and use of the estimated magnetic permeability and electrical conductivity and known nominal thickness of the pipes of the multiple nested conductive pipes; set an upper boundary curve for the total thickness by use of a curve with a highest predicted signal level of the set; and set a lower boundary curve for the total thickness by use of a curve with a lowest predicted signal level of the set. The control circuitry 1130, for example using one or more processors, can be arranged to determine a maximum error in total thickness estimation for a given signal level by use of the upper boundary curve and the lower boundary curve at the given signal level.

The control circuitry 1130, for example using one or more processors, can be arranged to estimate thickness of individual pipes of the multiple nested conductive pipes by use of remote field eddy current look-up curves at increasing time instants. The control circuitry 1130, for example using one or more processors, can be arranged to estimate the thickness of the individual pipes in a sequential manner. The start of the estimate can be from the innermost pipe.

The control circuitry 1130, for example using one or more processors, can be arranged to direct remedial operations with respect to the multiple nested conductive pipes in response to determination of the total thickness of the multiple nested conductive pipes or estimation of the thickness of individual pipes of the multiple nested conductive pipes.

In controlling operation of the components of system 1100 to execute schemes associated with investigation of multiple nested conductive pipes, the control circuitry 1130 can direct access of data to and from a database. The database can include parameters and/or expected parameters for the pipes being investigated such as, but not limited to, diameter (d), magnetic permeability ($\mu$), and electrical conductivity ($\sigma$).

The system 1100 can include a user interface 1162 operable with the control circuitry 1130, a data processing unit 1145 operable with the user interface 1162, where the control circuitry 1130, the user interface 1162, and the data processing unit 1145 are structured to be operated according to any scheme similar to or identical to the schemes associated with determining thickness in multiple nested conductive pipes as taught herein. The thickness determination can be used to determine defects in pipes of the multiple nested conductive pipe structure. The system 1100 can be arranged to perform various operations on the data, acquired from the tool 1105 operational in a multiple nested conductive pipes structure, in a manner similar or identical to any of the processing techniques discussed herein.

The system 1100 can be arranged as a distributed system. Data from operating the tool 1105 at various depths in the multiple nested conductive pipes structure can be processed by the one or more processors 1130. Alternatively, thickness analysis and subsequent defect analysis may be conducted by the data processing unit 1145 as a dedicated analysis module.

The system 1100 can include a memory module 1135, an electronic apparatus 1150, and a communications unit 1140. The control circuitry 1130, the memory module 1135, and the communications unit 1140 can be arranged to operate as a processing unit to control management of tool 1105 and to perform operations on data signals collected by the tool 1105. The memory module 1135 can include a database having information and other data such that the system 1100 can operate on data from the tool 1105. In an embodiment, the data processing unit 1145 can be distributed among the components of the system 1100 including memory module 1135 and/or the electronic apparatus 1150.

The communications unit 1140 can include downhole communications for communication to the surface at a well site from the tool 1105 in a multi-pipe structure. The communications unit 1140 may use combinations of wired communication technologies and wireless technologies at frequencies that do not interfere with on-going measurements. The communications unit 1140 can allow for a portion or all of the data analysis to be conducted within a multiple nested conductive pipes structure with results provided to the user interface 1162 for presentation on the one or more display unit(s) 1160 aboveground. The communications unit 1140 can provide for data to be sent aboveground such that substantially all analysis is performed aboveground. The data collected by the tool 1105 can be stored with the tool 1105 that can be brought to the surface to provide the data to the one or more processors 1130, the user interface 1162, and the data processing unit 1145. The communications unit 1140 can allow for transmission of commands to tool 1105 in response to signals provided by a user through the user interface 1162. Such commands may be generated from autonomous operation of the system 1100, once initiated.

The system 1100 can also include a bus 1137, where the bus 1137 provides electrical conductivity among the components of the system 1100. The bus 1137 can include an address bus, a data bus, and a control bus, each independently configured. The bus 1137 can be realized using a number of different communication mediums that allows for the distribution of components of the system 1100. Use of the bus 1137 can be regulated by the control circuitry 1130. The bus 1137 can include a communications network to transmit and receive signals including data signals and command and control signals.

In various embodiments, peripheral devices 1155 can include drivers to provide voltage and/or current input to the set of transmitters 1115, additional storage memory and/or other control devices that may operate in conjunction with the processor(s) 1130 and/or the memory module 1135. The display unit(s) 1160 can be arranged with a screen display, as a distributed component on the surface with respect to a well site, that can be used with instructions stored in the memory module 1135 to implement the user interface 1162 to manage the operation of the tool 1105 and/or components distributed within the system 1100. Such a user interface can be operated in conjunction with the communications unit 1140 and the bus 1137. The display unit(s) 1160 can include a video screen, a printing device, or other structure to visually project data/information and images. The system 1100 can include a number of selection devices 1164 operable with the user interface 1162 to provide user inputs to operate the data processing unit 1145 or its equivalent. The selection device(s) 1164 can include one or more of a touch screen, a computer mouse, or other control device operable with the user interface 1162 to provide user inputs to operate the data processing unit 1145 or other components of the system 1100.

Various techniques as taught herein can be implemented with tools that operate in the time-domain and use collocated transmitters and receivers that make measurements in a nested pipe structure. Since such tools use collocated transmitters and receivers, they can be intrinsically free from the ghost effect. Though such tools can employ model-based inversion to obtain the thickness of each individual pipe from the measurement, the techniques, taught herein, can be used to process the measurements to obtain the overall thickness of the pipes in real-time that requires no or minimal modeling.

A non-limiting example technique can include making a log measurement with an electromagnetic pulsed (time-domain) tool with the tool run inside strings of multiple nested conductive pipes. The tool can comprise at least one transmitter coil and at least one receiver coil. The least one transmitter coil and the at least one receiver coil may be collocated or separated. A baseline measurement in the log can be picked that corresponds to a nominal section of the pipes. Given the baseline measurement, solving for the magnetic permeability and the electrical conductivity of the pipes can be conducted. The estimated magnetic permeability and electrical conductivity and the known nominal thickness of the pipes can be used to determine the time instant in the decay response that corresponds to a RFEC regime, and a RFEC look-up curve can be generated.

The RFEC look-up curve can be used to determine the total thickness of the pipes at each depth in the measured log. The look-up curves may be computed by running a model a number of times equal to the number of the pipes in the nesting of pipes after the model is calibrated to a baseline measurement. Alternatively, the look-up curves may be computed from two baselines measurements without having to run the model. The thickness of individual pipes may be estimated sequentially, starting from the innermost pipe, by looking up curves at increasing time instants.

The following are example embodiments of methods, machine readable storage devices, and systems in accordance with the teachings herein.

A method 1 can comprise: making a set of log measurements using an electromagnetic pulsed tool disposed in multiple nested conductive pipes in a wellbore, and forming a measured log having measurement data at different depths in the multiple nested conductive pipes; and determining total thickness of the multiple nested conductive pipes at each depth in the measured log using a remote field eddy current look-up curve, the remote field eddy current look-up curve correlated to a remote field eddy current regime in time-domain associated with time decay response.

A method 2 can include elements of method 1 and can include using an electromagnetic pulsed tool to include using a transmitter coil and a receiver coil with the transmitter coil collocated with the receiver coil.

A method 3 can include elements of any of methods 1-2 and can include generating the remote field eddy current look-up curve by selecting a baseline measurement that corresponds to a nominal section of the multiple nested conductive pipes and estimating magnetic permeability and electrical conductivity of the multiple nested conductive pipes using the baseline measurement; determining a time instant in a decay response that corresponds to the remote field eddy current regime using the estimated magnetic permeability and electrical conductivity and known nominal thickness of the pipes of the multiple nested conductive pipes; and generating the remote field eddy current look-up curve using the time instant and using the estimated magnetic permeability and electrical conductivity and known nominal thickness of the pipes of the multiple nested conductive pipes.

A method 4 can include elements of method 3 and elements of any of methods 1-2 and can include the time instant in the decay response that corresponds to the remote field eddy current regime being a time instant in the decay response at which uncertainty in estimating the total thickness, using the look-up curve generated at that time instant and using a given signal level, is below a prescribed value.

A method 5 can include elements of method 3 and elements of any of methods 1-2 and 4 and can include generating the remote field eddy current look-up curve to include computing the remote field eddy current look-up curve by running a model a number of times equal to the number of the pipes, after the model is calibrated to a baseline measurement.

A method 6 can include elements of method 3 and elements of any of methods 1-2, 4, and 5 and can include generating a set of curves for predicted signal level at different times in a decay response versus the total thickness relationship using the time instant and using the estimated magnetic permeability and electrical conductivity and known nominal thickness of the pipes of the multiple nested conductive pipes; setting an upper boundary curve for the total thickness using a curve with a highest predicted signal level of the set; and setting a lower boundary curve for the total thickness using a curve with a lowest predicted signal level of the set.

A method 7 can include elements of method 6 and elements of any of methods 1-5 and can include determining a maximum error in total thickness estimation for a given signal level using the upper boundary curve and the lower boundary curve at the given signal level.

A method 8 can include elements of method 3 and elements of any of methods 1-2 and 4-7 and can include generating the remote field eddy current look-up curve to include computing the remote field eddy current look-up curve from two baselines measurements without running a model.

A method 9 can include elements of any of methods 1-8 and can include estimating thickness of individual pipes of the multiple nested conductive pipes using remote field eddy current look-up curves at increasing time instants.

A method 10 can include elements of method 9 and elements of any of methods 1-8 and can include estimating thickness of individual pipes of the multiple nested conductive pipes to include estimating the thickness of the individual pipes sequentially, starting from the innermost pipe.

A method 11 can include elements of method 9 and elements of any of methods 1-8 and 10 and can include directing remedial operations with respect to the multiple nested conductive pipes in response to determining the total thickness of the multiple nested conductive pipes or estimating the thickness of individual pipes of the multiple nested conductive pipes.

A machine-readable storage device 1 having instructions stored thereon, which, when executed by control circuitry of a machine, cause the machine to perform operations, the operations can comprise operations to: make a set of log measurements using an electromagnetic pulsed tool disposed in multiple nested conductive pipes in a wellbore, and form a measured log having measurement data at different depths in the multi-pipe structure; and to determine total thickness of the multiple nested conductive pipes at each depth in the measured log using a remote field eddy current look-up curve, the remote field eddy current look-up curve correlated to a remote field eddy current regime in time-domain associated with time decay response.

A machine-readable storage device 2 can include elements of machine-readable storage device 1 and can include use of the electromagnetic pulsed tool to include using a transmitter coil and a receiver coil with the transmitter coil collocated with the receiver coil.

A machine-readable storage device 3 can include elements of any of machine-readable storage devices 1-2 and can include the operations to include generating the remote field eddy current look-up curve by selecting a baseline measurement that corresponds to a nominal section of the multiple nested conductive pipes and estimating magnetic permeability and electrical conductivity of the multiple nested conductive pipes using the baseline measurement; determining a time instant in a decay response that corresponds to the remote field eddy current regime using the estimated magnetic permeability and electrical conductivity and known nominal thickness of the pipes of the multiple nested conductive pipes; and generating the remote field eddy current look-up curve using the time instant and using the estimated magnetic permeability and electrical conductivity and known nominal thickness of the pipes of the multiple nested conductive pipes.

A machine-readable storage device 4 can include elements of machine-readable storage device 3 and elements of any of machine-readable storage devices 1-2 and can include generating the remote field eddy current look-up curve to include computing the remote field eddy current look-up curve by running a model a number of times equal to the number of the pipes, after the model is calibrated to a baseline measurement.

A machine-readable storage device 5 can include elements of machine-readable storage device 3 and elements of any of machine-readable storage devices 1-2 and 4 and can include generating a set of curves for predicted signal level at different times in a decay response versus the total thickness relationship using the time instant and using the estimated magnetic permeability and electrical conductivity and known nominal thickness of the pipes of the multiple nested conductive pipes; setting an upper boundary curve for the total thickness using a curve with a highest predicted signal level of the set; and setting a lower boundary curve for the total thickness using a curve with a lowest predicted signal level of the set.

A machine-readable storage device 6 can include elements of machine-readable storage device 5 and elements of any of machine-readable storage devices 1-4 and can include operations to include determining a maximum error in total thickness estimation for a given signal level using the upper boundary curve and the lower boundary curve at the given signal level.

A machine-readable storage device 7 can include elements of machine-readable storage device 3 and elements of any of machine-readable storage devices 1-2 and 4-6 can include generating the remote field eddy current look-up curve to include computing the remote field eddy current look-up curve from two baselines measurements without running a model.

A machine-readable storage device 8 can include elements of any of machine-readable storage devices 1-7 and can include the operations to include estimating thickness of individual pipes of the multiple nested conductive pipes using remote field eddy current look-up curves at increasing time instants.

A machine-readable storage device 9 can include elements of machine-readable storage device 8 and elements of any of machine-readable storage device 1-7 and can include estimating thickness of individual pipes of the multiple nested conductive pipes to include estimating the thickness of the individual pipes sequentially, starting from the innermost pipe.

A machine-readable storage device 10 can include elements of machine-readable storage device 8 and elements of any of machine-readable storage devices 1-7 and 9 and can include the operations to include directing remedial operations with respect to the multiple nested conductive pipes in response to determining the total thickness of the multiple nested conductive pipes or estimating the thickness of individual pipes of the multiple nested conductive pipes.

A system 1 can comprise: a tool, the tool being an electromagnetic pulsed tool having a transmitter coil and a receiver coil arranged such the receiver coil receives a secondary field in response to a primary field generated from the transmitter coil; and a processor arranged to evaluate multiple nested conductive pipes in a wellbore from a set of log measurements acquired by use of the tool disposed in the multiple nested conductive pipes operable to form a measured log of measurement data at different depths in the multiple nested conductive pipes, the processor arranged to determine total thickness of the multiple nested conductive pipes at each depth in the measured log by use of a remote field eddy current look-up curve, the remote field eddy current look-up curve correlated to a remote field eddy current regime in time-domain associated with time decay response.

A system 2 can include elements of system 1 and can include the transmitter coil and the receiver coil collocated on the tool.

A system 3 can include elements of any of systems 1-2 and can include the processor arranged to generate the remote field eddy current look-up curve, the processor arranged to: select a baseline measurement that corresponds to a nominal section of the multiple nested conductive pipes and estimate magnetic permeability and electrical conductivity of the multiple nested conductive pipes based on the baseline measurement; determine a time instant in a decay response that corresponds to the remote field eddy current regime by use of the estimated magnetic permeability and electrical conductivity and known nominal thickness of the pipes of the multiple nested conductive pipes; and generate the remote field eddy current look-up curve by use of the time instant and use of the estimated magnetic permeability and electrical conductivity and known nominal thickness of the pipes of the multiple nested conductive pipes.

A system 4 can include elements of system 3 and elements of any of systems 1-2 and can include the processor arranged to generate the remote field eddy current look-up curve to include the processor arranged to compute the remote field eddy current look-up curve by performance of a run of a model a number of times equal to the number of the pipes, after the model is calibrated to a baseline measurement A system 5 can include elements of system 3 and elements of any of systems 1-2 and 4 and can include the processor arranged to generate a set of curves for predicted signal level at different times in a decay response versus the total thickness relationship by use of the time instant and use of the estimated magnetic permeability and electrical conductivity and known nominal thickness of the pipes of the multiple nested conductive pipes; set an upper boundary curve for the total thickness by use of a curve with a highest predicted signal level of the set; and set a lower boundary curve for the total thickness by use of a curve with a lowest predicted signal level of the set.

A system 6 can include elements of system 5 and elements of any of systems 1-4 and can include the processor arranged to determine a maximum error in total thickness estimation for a given signal level by use of the upper boundary curve and the lower boundary curve at the given signal level.

A system 7 can include elements of system 3 and elements of any of systems 1-2 and 4-6 and can include the processor arranged to generate the remote field eddy current look-up curve to include the processor arranged to compute the remote field eddy current look-up curve from two baselines measurements without a run of a model.

A system 8 can include elements of any of systems 1-7 and can include the processor arranged to estimate thickness of individual pipes of the multiple nested conductive pipes by use of remote field eddy current look-up curves at increasing time instants.

A system 9 can include elements of system 8 and elements of any of systems 1-7 and can include the processor arranged to estimate thickness of individual pipes of the multiple nested conductive pipes to include the processor arranged to estimate the thickness of the individual pipes in a sequential manner, start of the estimate being from the innermost pipe.

A system 10 can include elements of system 8 and elements of any of systems 1-7 and 9 and can include the processor arranged to direct remedial operations with respect to the multiple nested conductive pipes in response to determination of the total thickness of the multiple nested conductive pipes or estimation of the thickness of individual pipes of the multiple nested conductive pipes.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    forming a measured log including a set of log measurements at different depths using an electromagnetic pulsed tool disposed in multiple nested conductive pipes in a wellbore;
    generating one or more remote-field eddy current (RFEC) look-up curves based on measurements of normalized signal level responses for the multiple nested conductive pipes at one or more points in a time decay response;
    selecting an RFEC look-up curve at a point in the time decay response that indicates a total thickness of the multiple nested conductive pipes irrespective of a thickness for any specific one of the multiple nested conductive pipes; and
    determining the total thickness of the multiple nested conductive pipes at each depth in the measured log using the selected RFEC look-up curve.

2. The method of claim 1, wherein using the electromagnetic pulsed tool includes using a transmitter coil and a receiver coil with the transmitter coil collocated with the receiver coil.

3. The method of claim 1, wherein the method includes generating the one or more remote field eddy current look-up curves by,
    selecting a baseline measurement that corresponds to a nominal section of the multiple nested conductive pipes and estimating a magnetic permeability and an electrical conductivity of the multiple nested conductive pipes using the baseline measurement;
    determining a time instant in a decay response that corresponds to a remote field eddy current regime using the estimated magnetic permeability and electrical conductivity and a known nominal thickness of the pipes of the multiple nested conductive pipes; and
    generating the one or more remote field eddy current look-up curves using the time instant and using the estimated magnetic permeability and electrical conductivity and the known nominal thickness of the pipes of the multiple nested conductive pipes.

4. The method of claim 3, wherein the time instant in the decay response that corresponds to the remote field eddy current regime is a time instant in the decay response at which uncertainty in estimating the total thickness, using the remote field eddy current look-up curve generated at that time instant and using a given signal level, is below a prescribed value.

5. The method of claim 3, wherein generating the one or more remote field eddy current look-up curves includes computing the one or more remote field eddy current look-up curves by running a model a number of times equal to the number of the pipes, after the model is calibrated to the baseline measurement.

6. The method of claim 3, wherein the method includes
    generating a set of curves for predicted signal level at different times in the decay response versus total thickness relationship using the time instant and using the estimated magnetic permeability and electrical conductivity and the known nominal thickness of the pipes of the multiple nested conductive pipes;
    setting an upper boundary curve for the total thickness using a curve with a highest predicted signal level of the set; and
    setting a lower boundary curve for the total thickness using a curve with a lowest predicted signal level of the set; and
    determining a maximum error in total thickness estimation for a given signal level using the upper boundary curve and the lower boundary curve at the given signal level.

7. The method of claim 3, wherein generating the one or more remote field eddy current look-up curves includes computing the one or more remote field eddy current look-up curves from two baselines measurements without running a model.

8. The method of claim 1,
    wherein the method includes estimating thickness of individual pipes of the multiple nested conductive pipes using remote field eddy current look-up curves at increasing time instants, wherein estimating the thickness of individual pipes of the multiple nested conductive pipes includes estimating the thickness of the individual pipes sequentially, starting from an innermost pipe, and
    wherein the method includes directing remedial operations with respect to the multiple nested conductive pipes in response to determining the total thickness of the multiple nested conductive pipes or estimating the thickness of individual pipes of the multiple nested conductive pipes.

9. A machine-readable storage device having instructions stored thereon, which, when executed by a control circuitry of a machine, cause the machine to perform operations, the instructions comprising instructions to:

form a measured log including a set of log measurements at different depths using an electromagnetic pulsed tool disposed in multiple nested conductive pipes in a wellbore;

generate one or more remote-field eddy current (RFEC) look-up curves based on measurements of normalized signal level responses for the multiple nested conductive pipes at one or more points in a time decay response;

select an RFEC look-up curve at a point in the time decay response that indicates a total thickness of the multiple nested conductive pipes irrespective of a thickness for any specific one of the multiple nested conductive pipes; and determine the total thickness of the multiple nested conductive pipes at each depth in the measured log using the selected RFEC look-up curve.

10. The machine-readable storage device of claim 9, wherein using the electromagnetic pulsed tool includes using a transmitter coil and a receiver coil with the transmitter coil collocated with the receiver coil.

11. The machine-readable storage device of claim 9, wherein the instructions to generate the one or more remote field eddy current look-up curves comprise instructions to:

select a baseline measurement that corresponds to a nominal section of the multiple nested conductive pipes and estimating magnetic permeability and electrical conductivity of the multiple nested conductive pipes using the baseline measurement;

determine a time instant in a decay response that corresponds to a remote field eddy current regime using the estimated magnetic permeability and electrical conductivity and a known nominal thickness of the pipes of the multiple nested conductive pipes; and generate the one or more remote field eddy current look-up curves using the time instant and using the estimated magnetic permeability and electrical conductivity and the known nominal thickness of the pipes of the multiple nested conductive pipes, wherein the instructions to generate the one or more remote field eddy current look-up curves include instructions to compute the one or more remote field eddy current look-up curves by at least one of:

running a model a number of times equal to the number of the pipes, after the model is calibrated to the baseline measurement, and using two baselines measurements without running a model.

12. The machine-readable storage device of claim 11, wherein the instructions to generate the one or more remote field eddy current look-up curves further include instructions to:

generate a set of curves for predicted signal level at different times in the decay response versus total thickness relationship using the time instant and using the estimated magnetic permeability and electrical conductivity and the known nominal thickness of the pipes of the multiple nested conductive pipes;

set an upper boundary curve for the total thickness using a curve with a highest predicted signal level of the set; and set a lower boundary curve for the total thickness using a curve with a lowest predicted signal level of the set.

13. The machine-readable storage device of claim 12, wherein the instructions comprise instructions to determine a maximum error in total thickness estimation for a given signal level using the upper boundary curve and the lower boundary curve at the given signal level.

14. The machine-readable storage device of claim 9, wherein the instructions comprise instructions to estimate a thickness of individual pipes of the multiple nested conductive pipes using remote field eddy current look-up curves at increasing time instants, wherein the instructions to estimate the thickness of individual pipes of the multiple nested conductive pipes comprise instructions to estimate the thickness of the individual pipes sequentially, starting from an innermost pipe, and wherein the instructions comprise instructions to direct remedial operations with respect to the multiple nested conductive pipes in response to determining the total thickness of the multiple nested conductive pipes or estimating the thickness of individual pipes of the multiple nested conductive pipes.

15. A system comprising:

a tool, the tool being an electromagnetic pulsed tool having a transmitter coil and a receiver coil arranged such the receiver coil receives a secondary field in response to a primary field generated from the transmitter coil; and a processor;

a machine-readable storage medium comprising program code executable by the processor, the program code including instructions to, evaluate multiple nested conductive pipes in a wellbore at different depths from a set of log measurements acquired by use of the tool disposed in the multiple nested conductive pipes;

form a measured log including one or more of the log measurements at the different depths in the multiple nested conductive pipes;

generate a remote-field eddy current (RFEC) look-up curve based on measurements of normalized signal level responses for the multiple nested conductive pipes at one or more points in a time decay response;

select an RFEC look-up curve at a point in the time decay response that indicates a total thickness of the multiple nested conductive pipes irrespective of a thickness for any specific one of the multiple nested conductive pipes; and determine the total thickness of the multiple nested conductive pipes at each depth in the measured log by use of the selected RFEC look-up curve.

16. The system of claim 15, wherein the transmitter coil and the receiver coil are collocated on the tool.

17. The system of claim 15, wherein the instructions to generate the one or more remote field eddy current look-up curves comprise instructions to:

select a baseline measurement that corresponds to a nominal section of the multiple nested conductive pipes and estimate magnetic permeability and electrical conductivity of the multiple nested conductive pipes based on the baseline measurement;

determine a time instant in a decay response that corresponds to a remote field eddy current regime by use of the estimated magnetic permeability and electrical conductivity and a known nominal thickness of the pipes of the multiple nested conductive pipes; and generate the one or more remote field eddy current look-up curves by use of the time instant and use of the estimated magnetic permeability and electrical conductivity and the known nominal thickness of the pipes of the multiple nested conductive pipes, wherein the program code to generate the one or more remote field eddy current look-up curves includes program code to compute the one or more remote field eddy current look-up curves by at least one of:
   performance of a run of a model a number of times equal to the number of the pipes, after the model is calibrated to the baseline measurement, and
   a use of two baseline measurements without a run of a model.

18. The system of claim 17, further comprising instructions to:
   generate a set of curves for predicted signal level at different times in the decay response versus total thickness relationship by use of the time instant and use of the estimated magnetic permeability and electrical conductivity and the known nominal thickness of the pipes of the multiple nested conductive pipes;
   set an upper boundary curve for the total thickness by use of a curve with a highest predicted signal level of the set;
   set a lower boundary curve for the total thickness by use of a curve with a lowest predicted signal level of the set; and
   determine a maximum error in total thickness estimation for a given signal level by use of the upper boundary curve and the lower boundary curve at the given signal level.

19. The system of claim 15, wherein the program code comprises instructions to estimate thickness of individual pipes of the multiple nested conductive pipes by use of remote field eddy current look-up curves at increasing time instants.

20. The system of claim 19,
   wherein the instructions to estimate thickness of individual pipes of the multiple nested conductive pipes comprises instructions to estimate the thickness of the individual pipes in a sequential manner, wherein the estimate starts from an innermost pipe; and
   wherein the program code further includes instructions to direct remedial operations with respect to the multiple nested conductive pipes in response to determination of the total thickness of the multiple nested conductive pipes or estimation of the thickness of individual pipes of the multiple nested conductive pipes.

* * * * *